US012662799B2

(12) United States Patent
Hatta

(10) Patent No.: US 12,662,799 B2
(45) Date of Patent: Jun. 23, 2026

(54) HOSE CLAMP STRUCTURE AND WORKING MACHINE

(71) Applicant: KUBOTA CORPORATION, Osaka (JP)

(72) Inventor: Kazuyuki Hatta, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 309 days.

(21) Appl. No.: 18/536,807

(22) Filed: Dec. 12, 2023

(65) Prior Publication Data

US 2024/0125095 A1 Apr. 18, 2024

Related U.S. Application Data

(63) Continuation of application No. PCT/JP2022/014354, filed on Mar. 25, 2022.

(30) Foreign Application Priority Data

Jun. 29, 2021 (JP) ................................. 2021-107840

(51) Int. Cl.
*E02F 9/22* (2006.01)
*B60R 16/08* (2006.01)
(Continued)

(52) U.S. Cl.
CPC ............ *E02F 9/2275* (2013.01); *B60R 16/08* (2013.01); *E02F 9/0866* (2013.01); *F16L 5/00* (2013.01); *E02F 9/2285* (2013.01)

(58) Field of Classification Search
CPC ..... E02F 9/2275; E02F 9/2285; E02F 9/2264; E02F 9/2278; E02F 9/0866; E02F 9/0858; B60R 16/08; F16L 5/00
See application file for complete search history.

(56) References Cited

U.S. PATENT DOCUMENTS 8,267,357 B2 * 9/2012 Kataoka ................. B61D 49/00
248/68.1
11,384,867 B2 * 7/2022 Relph ................... F16L 3/1211
(Continued)

FOREIGN PATENT DOCUMENTS

EP 1 837 572 A1 9/2007
JP 1986-051298 U 4/1986
(Continued)

OTHER PUBLICATIONS

International Search Report dated Jun. 7, 2022 in international patent application No. PCT/JP2022/014354, with English language translation thereof.
(Continued)

*Primary Examiner* — John D Walters
(74) *Attorney, Agent, or Firm* — GREENBLUM & BERNSTEIN, P.L.C.

(57) ABSTRACT

A hose clamp structure includes a vertical plate having an opening, a groove portion provided at a back side of the vertical plate on one side of the opening, the groove portion being open toward the opening, a receiver portion provided at the back side of the vertical plate on the other side of the opening, a first clamping member to be inserted in the groove portion, an elastic second clamping member configured such that the second clamping member is placed in the receiver portion through the opening to contact the receiver portion and such that hose(s) passing through the opening is held between the first clamping member and the second clamping member, and a pressing member to be attached to the vertical plate to press the second clamping member from the front side to elastically deform the second clamping member to press the first clamping member.

6 Claims, 14 Drawing Sheets

(51) Int. Cl.
    *E02F 9/08*          (2006.01)
    *F16L 5/00*          (2006.01)

(56)                References Cited

U.S. PATENT DOCUMENTS

| | | | |
|---|---|---|---|
| 11,781,291 B2 * | 10/2023 | Nishigori | B60N 2/75 |
| | | | 180/315 |
| 2011/0253846 A1 | 10/2011 | Kataoka et al. | |
| 2014/0265157 A1 | 9/2014 | Mukai et al. | |
| 2020/0190774 A1 | 6/2020 | Nishigori et al. | |

FOREIGN PATENT DOCUMENTS

| | | |
|---|---|---|
| JP | 1986-179784 U | 11/1986 |
| JP | 2004-028220 A | 1/2004 |
| JP | 2011-171617 A | 9/2011 |
| JP | 2017-067212 A | 4/2017 |
| JP | 2019-116752 A | 7/2019 |

OTHER PUBLICATIONS

Written Opinion dated Jun. 7, 2022 in international patent application No. PCT/JP2022/014354.with English language translation thereof.
Extended European Search Report, dated May 14, 2025, issued in European Patent Office (EPO) Patent Application No. 22832510.6.

* cited by examiner

HOSE CLAMP STRUCTURE AND WORKING MACHINE

CROSS REFERENCE TO RELATED APPLICATIONS

This application is a continuation application of International Application No. PCT/JP2022/014354, filed on Mar. 25, 2022, which claims the benefit of priority to Japanese Patent Application No. 2021-107840, filed on Jun. 29, 2021. The entire contents of each of these applications are hereby incorporated herein by reference.

BACKGROUND OF THE INVENTION

1. Field of the Invention

The present invention relates to a hose clamp structure and a working machine.

2. Description of the Related Art

A hose clamp structure disclosed in Japanese Unexamined Patent Application Publication No. 2019-116752 is known.

In the hose clamp structure disclosed in Japanese Unexamined Patent Application Publication No. 2019-116752, a cutout recess is formed in an upper portion of a partition plate that partitions the lower front of a prime mover chamber that houses a prime mover such that the cutout recess is recessed downward from an upper end of the partition plate, a grommet that holds a hose in an up-down direction is inserted into the cutout recess, a retaining plate that prevents the grommet from being removed from the cutout recess is attached to the partition plate, and further the grommet and the retaining plate are pressed from above by a seal body provided on a partition wall that separates the prime mover chamber from the upper front of the prime mover chamber.

SUMMARY OF THE INVENTION

The hose clamp structure disclosed in Japanese Unexamined Patent Application Publication No. 2019-116752 has a problem that the partition wall needs to be removed when the hose is removed, and thus maintainability is poor.

Example embodiments of the present invention provide hose clamp structures and working machines from each of which a hose can be easily removed.

A hose clamp structure according to an aspect of an example embodiment of the present invention includes a vertical plate having an opening, a groove portion provided at a back side of the vertical plate on one of opposite sides of the opening in a plate-surface parallel direction such that the groove portion is adjacent to the opening, the groove portion being open toward the opening in the plate-surface parallel direction, a receiver portion provided at the back side of the vertical plate on the other of the opposite sides of the opening in the plate-surface parallel direction, a first clamping member to be inserted in the groove portion, a second clamping member made of an elastic member and configured such that the second clamping member is placed in the receiver portion through the opening from a front side of the vertical plate to contact the receiver portion with the first clamping member being inserted in the groove portion and such that at least one hose passing through the opening is held between the first clamping member and the second clamping member, and a pressing member to be attached to the vertical plate to press the second clamping member from the front side of the vertical plate to elastically deform the second clamping member to cause the second clamping member to press the first clamping member.

The first clamping member may have a thickness substantially equal to a groove width of the groove portion. The second clamping member may have a thickness such that the second clamping member protrudes forward through a back surface of the vertical plate via the opening when the second clamping member is in contact with the receiver portion but is not pressed by the pressing member. The pressing member may include a main plate to be inserted in the opening to press the second clamping member, and an attachment plate fixed to the main plate to contact a front surface of the vertical plate and attached to the vertical plate.

The vertical plate may have an insertion groove extending from an outer edge of the vertical plate toward the opening to communicate with the opening and configured to allow the at least one hose to pass through the insertion groove in a direction perpendicular to a longitudinal direction of the at least one hose.

The groove portion may include a first portion which is a portion of the vertical plate that defines one of opposite edges of the opening in the plate-surface parallel direction, a second portion facing the first portion at the back side of the vertical plate, and a third portion extending from one of opposite edges of the second portion in the plate-surface parallel direction toward a back surface of the vertical plate and fixed to the vertical plate.

The receiver portion may include a first wall portion facing the opening at the back side of the vertical plate, and a second wall portion extending from one of opposite edges of the first wall portion in the plate-surface parallel direction toward a back surface of the vertical plate and fixed to the vertical plate. The second clamping member may be placed to contact the first wall portion and the second wall portion through the opening from the front side of the vertical plate.

A working machine according to an aspect of the present invention includes a machine body, a prime mover on the machine body, a partition wall to separate a prime mover chamber housing the prime mover from an outside of the prime mover chamber, and the hose clamp structure, wherein the vertical plate defines a portion of the partition wall, and the at least one hose is guided from the prime mover chamber to an outside of the partition wall.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 7 is an exploded perspective view of a cover member and the like.

DETAILED DESCRIPTION OF THE EXAMPLE EMBODIMENTS

Figure 1:
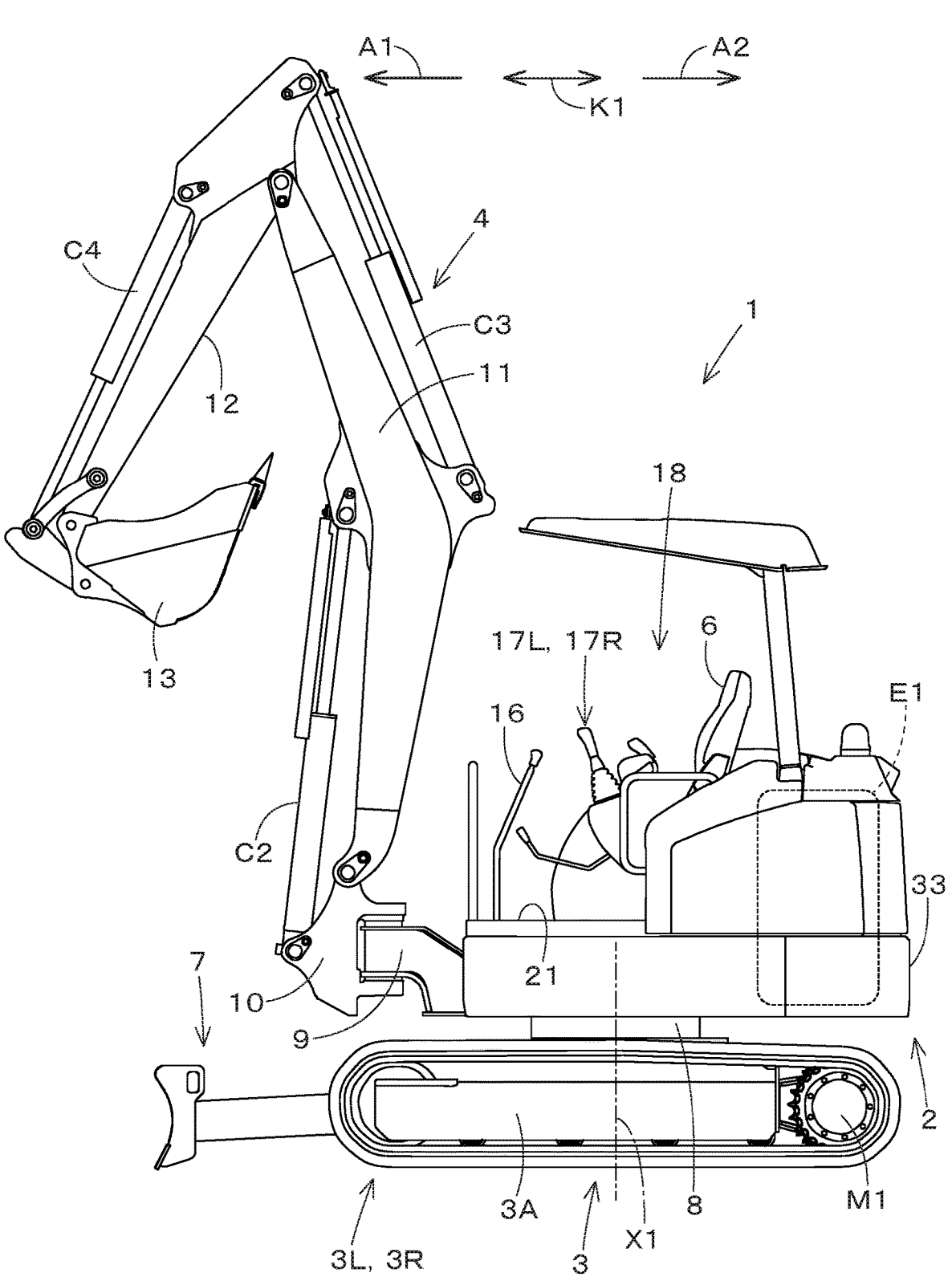
FIG. 1 is a side view of a working machine.

The example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

FIG. 1 is a schematic side view illustrating an overall configuration of a working machine 1 according to the present embodiment. In the present embodiment, a backhoe, which is a turning working machine, is exemplified as the working machine 1.

As illustrated in FIG. 1, the working machine 1 includes a machine body (turning base) 2, a traveling device 3, and a working device 4. An operator's seat 6 on which an operator (driver) is seated is mounted on the machine body 2.

In the present embodiment, a direction toward the front of the operator seated on the operator's seat 6 of the working machine 1 (arrow A1 direction in FIG. 1) is described as a forward side (machine-body forward side), a direction toward the rear of the operator (arrow A2 direction in FIG. 1) is described as a rearward side (machine-body rearward side), and an arrow K1 direction in FIG. 1 is described as a front-rear direction (machine-body front-rear direction). Also, a direction toward the left of the operator (near side in FIG. 1) is described as a leftward side, and a direction toward the right of the operator (far side in FIG. 1) is described as a rightward side.

Also, a horizontal direction that is a direction perpendicular to the front-rear direction K1 is described as a machine-body width direction. A direction from a center portion to a right portion or a left portion in a width direction of the machine body 2 is described as an outward side in the machine-body width direction. That is, the outward side in the machine-body width direction is a direction away from the center in the width direction of the machine body 2 in the machine-body width direction. A direction opposite to the outward side in the machine-body width direction is described as an inward side in the machine-body width direction. That is, the inward side in the machine-body width direction is a direction toward the center in the width direction of the machine body 2 in the machine-body width direction.

As illustrated in FIG. 1, the traveling device 3 is a crawler type traveling device that supports the machine body 2 so as to be travelable, and includes a traveling frame 3A, a first traveling device 3L provided on the left of the traveling frame 3A, and a second traveling device 3R provided on the right of the traveling frame 3A. The first traveling device 3L and the second traveling device 3R are driven by a traveling motor M1 including a hydraulic motor (hydraulic actuator). In the present embodiment, the crawler type traveling device 3 is used, but this does not imply any limitation, and a wheel type traveling device or the like may be used. A dozer device 7 is attached to a front portion of the traveling device 3. The dozer device 7 can be driven by a dozer cylinder including a hydraulic cylinder (hydraulic actuator).

As illustrated in FIG. 1, the machine body 2 is supported on the traveling device 3 via a turning bearing 8 so as to be turnable about a turning axis X1 that is an axis extending in an up-down direction. Additionally, the machine body 2 includes, in a front portion thereof, a support bracket 9 and a swing bracket 10 that support the working device 4. The support bracket 9 is provided so as to protrude forward from the machine body 2. The swing bracket 10 is attached to a front portion of the support bracket 9 so as to be swingable about a vertical axis (an axis extending in the up-down direction).

As illustrated in FIG. 1, the working device 4 includes a boom 11, an arm 12, and a bucket 13. A base portion of the boom 11 is pivotally attached to an upper portion of the swing bracket 10 so as to be rotatable about a lateral axis (an axis extending in the machine-body width direction). The arm 12 is pivotally attached to a distal end side of the boom 11 so as to be rotatable about a lateral axis. The bucket 13 is provided at a distal end side of the arm 12 so as to be capable of performing shoveling and dumping. The shoveling is a motion of swinging the bucket 13 in a direction toward the boom 11, and is, for example, a motion of shoveling earth and sand or the like. Also, the dumping is a motion of swinging the bucket 13 in a direction away from the boom 11, and is, for example, a motion of dropping (discharging) shoveled earth and sand or the like.

Instead of or in addition to the bucket 13, another working tool (hydraulic attachment) that can be driven by a hydraulic actuator can be attached to the working machine 1. Examples of the other working tool include a hydraulic breaker, a hydraulic crusher, an angle broom, an earth auger, a pallet fork, a sweeper, a mower, and a snow blower.

The swing bracket 10 is swingable by expansion and contraction of a swing cylinder (not illustrated). The boom 11 is swingable by expansion and contraction of a boom cylinder C2. The arm 12 is swingable by expansion and contraction of an arm cylinder C3. The bucket 13 is capable of performing shoveling and dumping by expansion and contraction of a bucket cylinder C4. The swing cylinder, the boom cylinder C2, the arm cylinder C3, and the bucket cylinder C4 include hydraulic cylinders (hydraulic actuators).

As illustrated in FIG. 1, a prime mover E1 is mounted in a rear portion of the machine body 2. The prime mover E1 is a diesel engine. Alternatively, the prime mover E1 may be a gasoline engine or an electric motor, or may be a hybrid type including an engine and an electric motor. An operation unit 18 including the operator's seat 6, a traveling lever 16 located forward of the operator's seat 6, a manipulating device 17L located leftward of the operator's seat 6, a manipulating device 17R located rightward of the operator's seat 6, and the like is mounted on a forward of the prime mover E1 of the machine body 2. The traveling lever 16 is an operation member that operates the traveling device 3. The manipulating devices 17L and 17R are devices that perform, for example, a swinging operation of the boom 11, a swinging operation of the arm 12, operations of shoveling and dumping of the bucket 13, a turning operation of the machine body 2, and the like. A step 21 that defines a floor surface is provided on an upper surface side of the machine body 2 and a forward side of the operator's seat 6.

Figure 2:
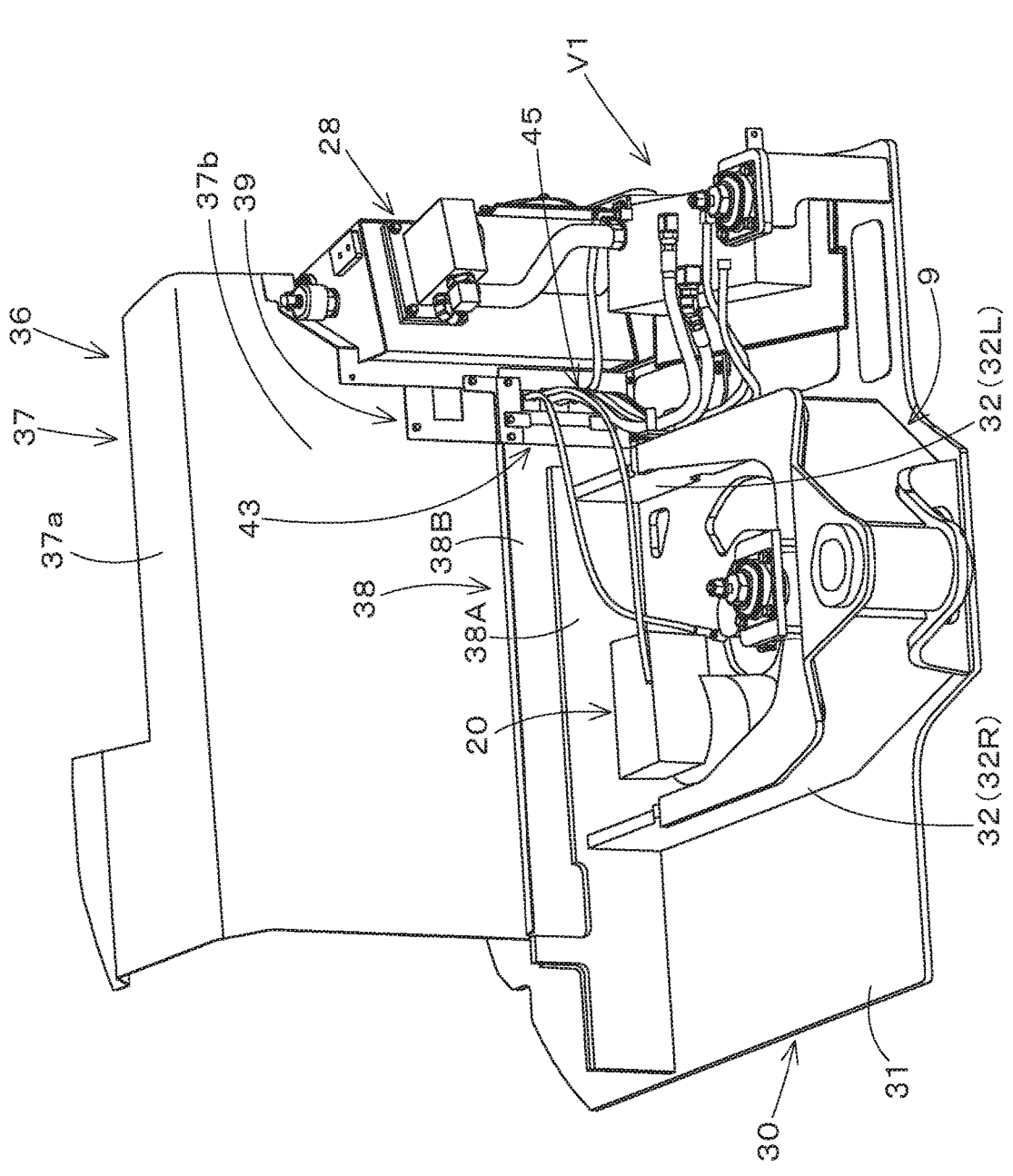
FIG. 2 is a front perspective view illustrating a portion of a machine body.

As illustrated in FIG. 2, the machine body 2 includes a turning frame 30 serving as a framework. The turning frame 30 includes a turning base plate (base plate) 31 that defines a bottom portion of the machine body 2, a reinforcing rib 32 that reinforces the turning base plate 31, the support bracket 9, and a weight 33 (see FIG. 1). Additionally, the turning frame 30 includes brackets, stays, and the like for attaching devices, tanks, other components, and the like mounted on the machine body 2.

The turning base plate 31 is formed of a thick steel plate or the like. The brackets, stays, and the like provided on the turning frame 30 are fixed onto the turning base plate 31 by welding or the like. The turning base plate 31 is supported on the traveling device 3 via the turning bearing 8 so as to be rotatable about the turning axis X1.

The reinforcing rib 32 is formed of a plate member and is provided on the turning base plate 31 to extend from a front portion toward a rear portion. Specifically, the reinforcing rib 32 includes a first vertical rib 32R extending rearward from a rear portion of a right portion of the support bracket 9 provided on the front portion of the turning base plate 31, and a second vertical rib 32L extending rearward from a rear portion of a left portion of the support bracket 9.

As illustrated in FIG. 2, a control valve V1, a hydraulic fluid tank 28, a turning motor 20, and the like are attached on the turning base plate 31.

The control valve V1 is located on a front portion of a left portion of the turning base plate 31. The control valve V1 controls the flow rate of a hydraulic fluid to be supplied to the hydraulic actuators provided in the working machine 1 and driven with the hydraulic fluid. Specifically, the control valve V1 is a valve unit in which control valves that control the flow rate of the hydraulic fluid to be supplied to each of the hydraulic actuators provided in the working machine 1 are collected.

The hydraulic fluid tank 28 is located rearward of the control valve V1. The hydraulic fluid tank 28 is a tank that stores the hydraulic fluid.

Figure 3:
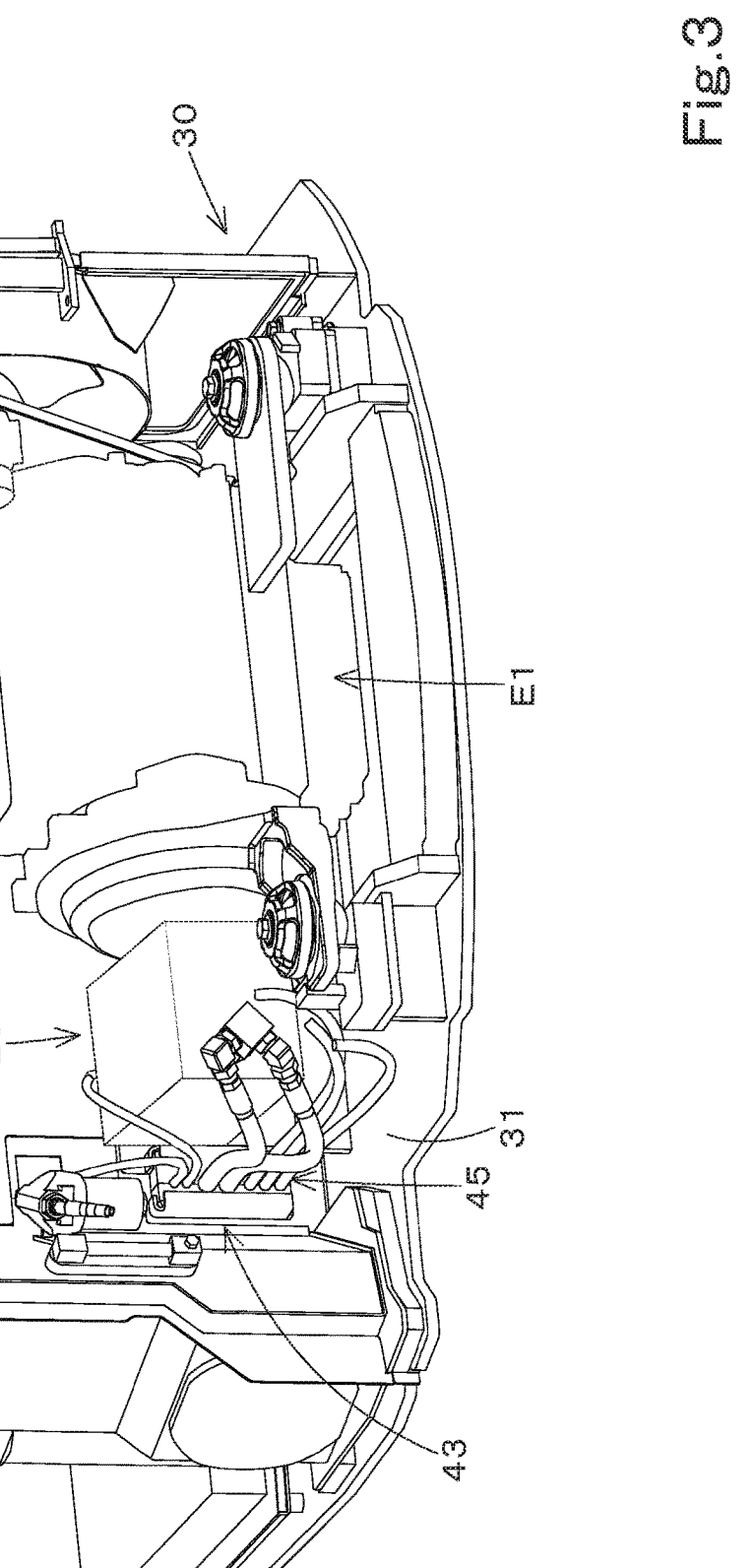
FIG. 3 is a back perspective view illustrating a portion of a machine body.

As illustrated in FIG. 3, the prime mover E1 is mounted on the rear portion of the turning base plate 31. A hydraulic pump 25 is attached to a one-side portion (left portion) in the machine-body width direction of the prime mover E1. The hydraulic pump 25 is driven by power of the prime mover E1. The hydraulic pump 25 sucks the hydraulic fluid in the hydraulic fluid tank 28 and delivers the hydraulic fluid (pressure oil) for driving the hydraulic actuators such as hydraulic motors, hydraulic cylinders, and the like provided in the working machine 1. Also, the hydraulic pump 25 delivers a pilot pressure for actuating a hydraulic valve and a hydraulic pressure for a signal.

A cooling fan 14 is provided on a right portion of the prime mover E1, and a radiator, an oil cooler, a fuel cooler, and the like are located rightward of the cooling fan 14.

Figure 5:
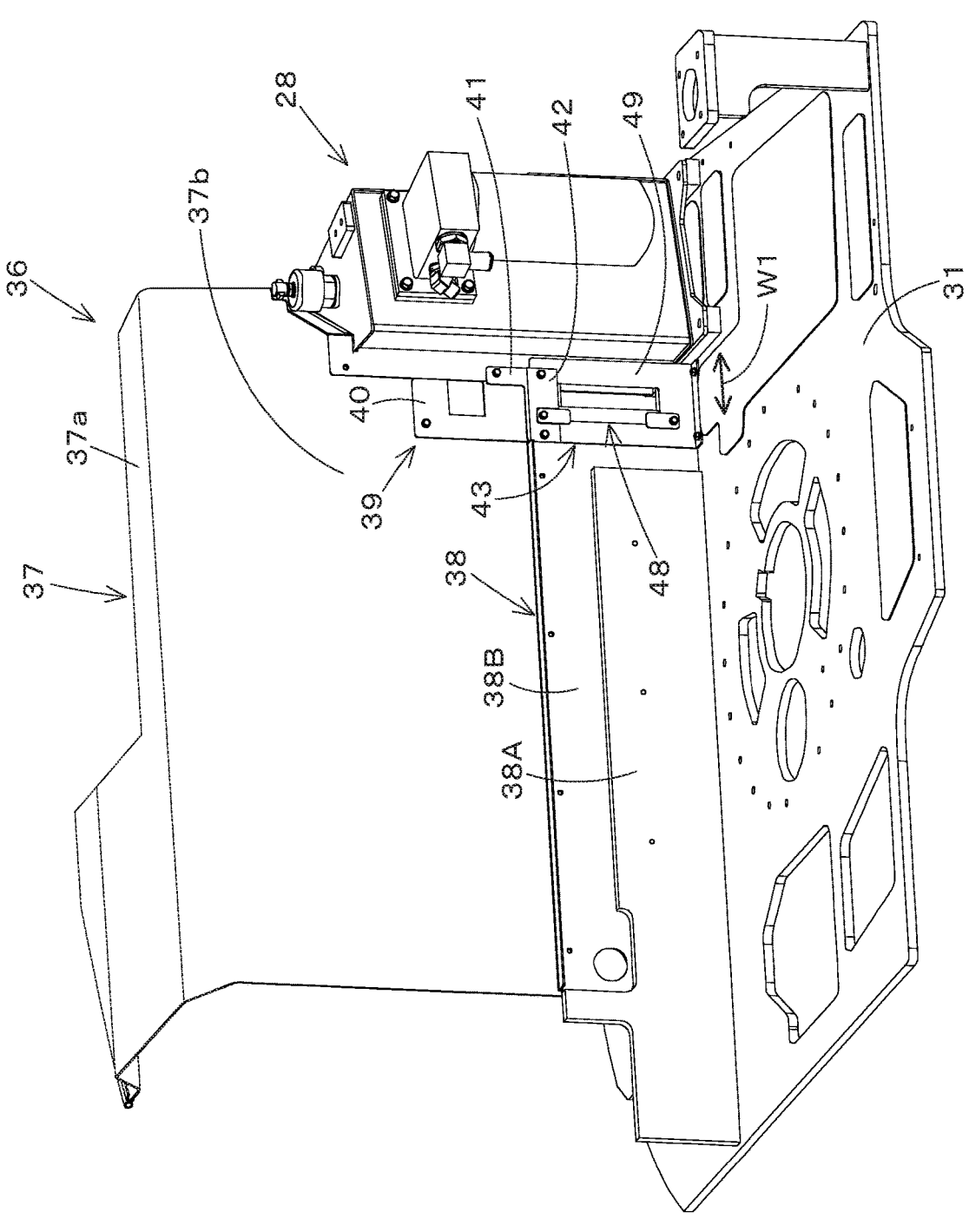
FIG. 5 is a front perspective view illustrating a place where a hose clamp is provided.

As illustrated in FIG. 3, a partition wall 36 that defines a front portion side of a prime mover chamber E2 that houses the prime mover E1 is provided forward of the prime mover E1. In other words, the partition wall 36 is a member that separates the prime mover chamber E2 from the front of the prime mover chamber E2 (the outside of the prime mover chamber E2). As illustrated in FIG. 5, the hydraulic fluid tank 28 is located leftward of the partition wall 36. The hydraulic fluid tank 28 is installed on the turning base plate 31.

As illustrated in FIG. 5, the partition wall 36 includes a partition wall main body 37 and a partition plate 38. The partition wall main body 37 is a member that separates the prime mover chamber E2 from the upper front of the prime mover chamber E2, and includes an upper wall 37a and a front wall 37b extending downward from a front portion of the upper wall 37a.

Figure 6:
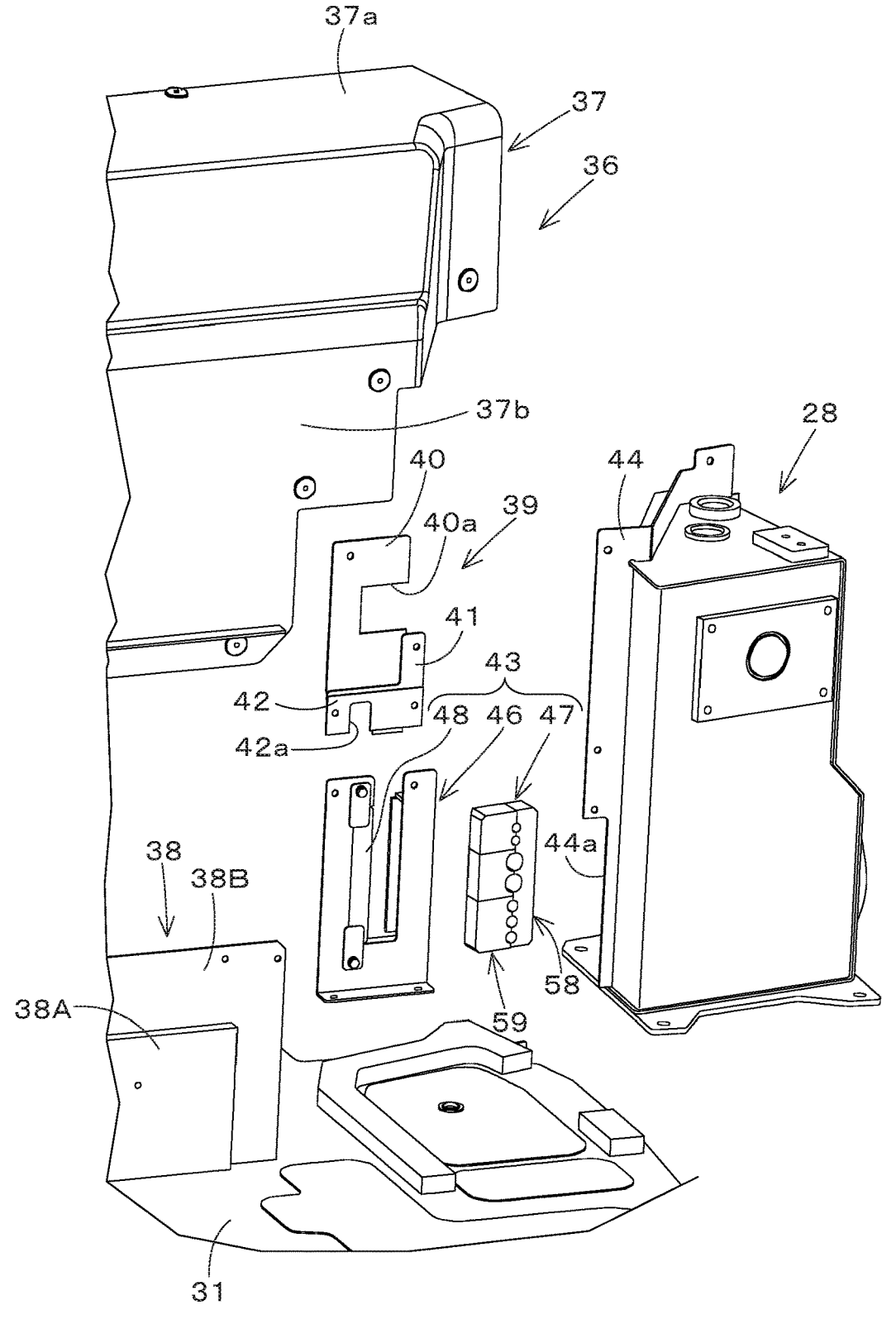
FIG. 6 is an exploded perspective view of a place where a hose clamp is provided.

As illustrated in FIG. 5, the partition plate 38 is located lower than the partition wall main body 37. Also, the partition plate 38 is located lower than the step 21. That is, the partition plate 38 is a member that partitions the lower front of the prime mover chamber E2. The partition plate 38 includes a first partition plate 38A and a second partition plate 38B. The first partition plate 38A is erected on the turning base plate 31 such that plate surfaces face in the front-rear direction K1. Also, the first partition plate 38A is located on the turning base plate 31 so as to extend in the machine-body width direction and is fixed to the turning base plate 31 by welding or the like. The second partition plate 38B has a lower portion fixed to a back surface of the first partition plate 38A by welding or the like, and a left portion fixed to the turning base plate 31 by welding or the like. A lower portion of the partition wall main body 37 (a lower portion of the front wall 37b) is attached to the second partition plate 38B. As illustrated in FIG. 6, the second partition plate 38B protrudes leftward of the first partition plate 38A.

As illustrated in FIGS. 5 and 6, a cover member 39 and a hose clamp 43 are provided between the partition wall 36 and the hydraulic fluid tank 28. The hose clamp 43 is located lower than the cover member 39. The cover member 39 and the hose clamp 43 close a space between the partition wall 36 and the hydraulic fluid tank 28. The cover member 39 and the hose clamp 43 define a portion of the partition wall 36.

Figure 7:
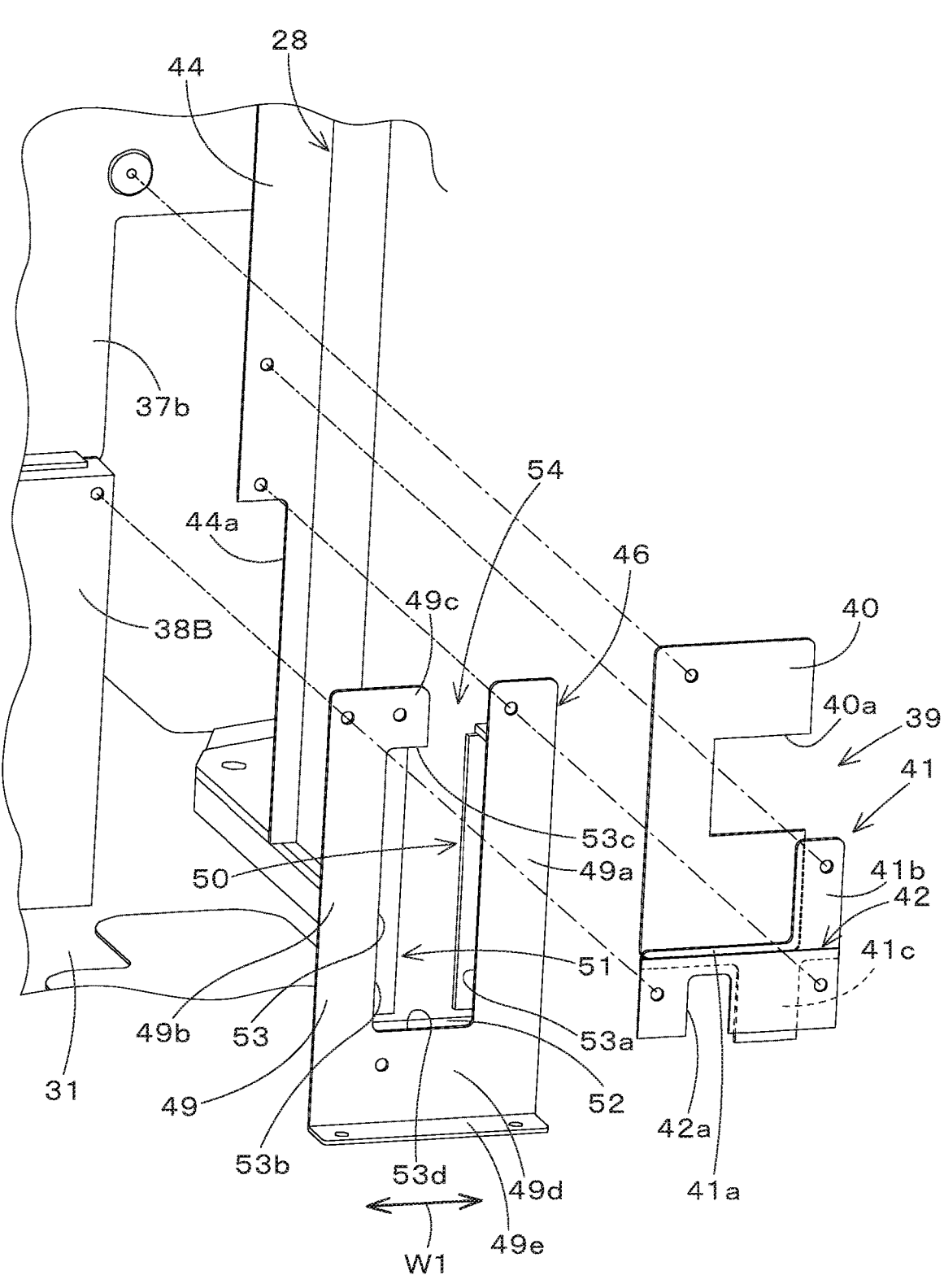

As illustrated in FIGS. 6 and 7, the cover member 39 includes a first cover 40, a second cover 41, and a third cover 42. The first cover 40 is formed in a rectangular shape having an angular U-shaped cutout groove 40a that opens leftward. The cutout groove 40a is for passing a routing member such as a harness obtained by bundling wires, and a space between the cutout groove 40a and the harness is sealed with a grommet. The second cover 41 includes a first portion 41a, a second portion 41b, and a third portion (extension portion) 41c. The first portion 41a is fixed to a lower end portion and a front surface side of the first cover 40 by welding or the like. The second portion 41b is fixed to a left end portion and the front surface side of the first cover 40 by welding or the like to be located lower than the cutout groove 40a. The third portion 41c extends downward from a left portion of the first portion 41a. The third cover 42 is formed in a rectangular shape having an angular U-shaped cutout groove 42a that opens downward. The cutout groove 42a is formed slightly rightward of a center portion in the machine-body width direction of the third cover 42. An upper portion of the third cover 42 is fixed to a front surface of the second portion 41b of the second cover 41 by welding or the like. The cutout groove 42a is displaced rightward with respect to the third portion 41c of the second cover 41. The cutout groove 42a is a groove for avoiding interference between the third cover 42 and an upper attachment plate 57A of a pressing member 48 (described later).

The first cover 40 is bolted to the front wall 37b of the partition wall main body 37, and the second cover 41 is bolted to a flange plate 44 fixed to the hydraulic fluid tank 28 by welding or the like so as to protrude outward from the hydraulic fluid tank 28. A cutout portion 44a for avoiding interference with a groove portion 50 (described later) is formed in a lower portion of the flange plate 44 (see FIG. 11).

The third cover 42 is bolted to the second partition plate 38B and the flange plate 44 together with a vertical plate 49 (described later).

Figure 4:
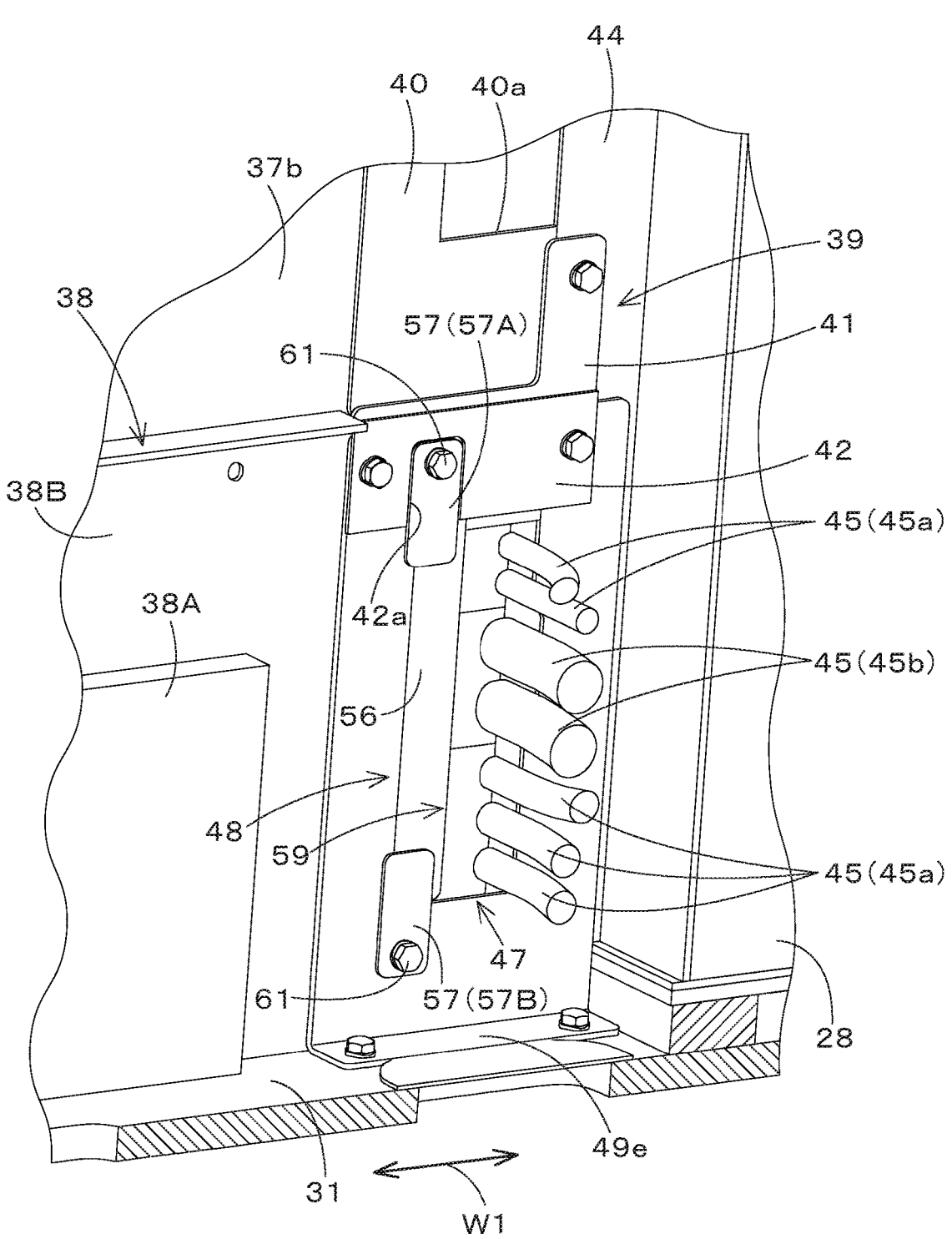
FIG. 4 is a front perspective view illustrating a hose clamp structure.

As illustrated in FIGS. 2, 3, and 4, the hose clamp 43 holds hoses such as hydraulic hose(s) 45 guided to an area forward of the partition wall 36 from the prime mover E1 (guided to the outside of the prime mover E1). The hose clamp 43 is provided between the partition plate 38 and the hydraulic fluid tank 28. Thus, the hose clamp 43 is located lower than the step 21 (inside the machine body 2) together with the control valve V1. The hydraulic hose(s) 45 held by the hose clamp 43 may be a plurality of hydraulic hoses 45. Most of the plurality of hydraulic hoses 45 are hoses that connect the hydraulic pump 25 and the control valve V1. As illustrated in FIG. 4, in the present embodiment, the number of the plurality of hydraulic hoses 45 is seven. The seven hydraulic hoses 45 are arranged in the up-down direction, and two upper hydraulic hoses 45a and three lower hydraulic hoses 45a are small-diameter hoses each having a diameter smaller than the diameter of each of two middle hydraulic hoses 45b.

As illustrated in FIG. 6, the hose clamp 43 includes a holding body 46 attached directly or indirectly to a machine body 2, a clamping tool 47 that is held by the holding body 46 and that holds the hydraulic hoses 45, and a pressing member 48 that presses the clamping tool 47.

Figure 8:
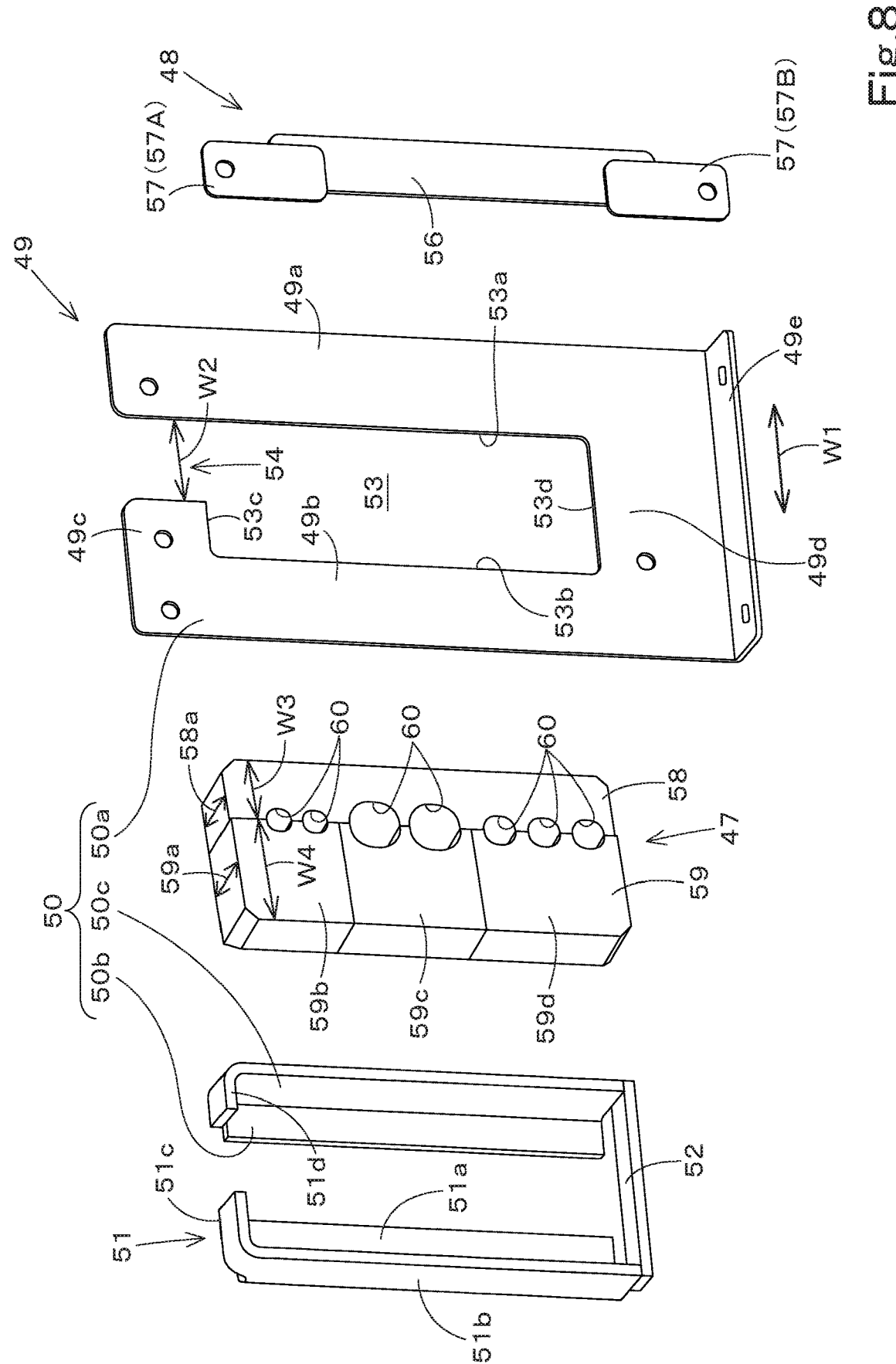
FIG. 8 is an exploded perspective view of a hose clamp.

As illustrated in FIG. 8, the holding body 46 includes a vertical plate 49, a groove portion 50, a receiver portion 51, and a coupling plate 52.

As illustrated in FIG. 8, the vertical plate 49 is located such that plate surfaces face in the front-rear direction K1. That is, the vertical plate 49 is located such that a plate width direction (plate-surface parallel direction) W1 perpendicular to the up-down direction coincides with the machine-body width direction, and a plate thickness direction coincides with the front-rear direction K1. The vertical plate 49 has an opening 53 and an insertion groove 54. Specifically, the vertical plate 49 includes a first vertical wall portion 49a that is a portion (left portion) provided on one of opposite sides in the plate width direction W1 (on the left of the opposite sides in the machine-body width direction, on the right in FIG. 8), a second vertical wall portion 49b that is a portion (right portion) provided on the other of the opposite sides in the plate width direction W1 (on the right of the opposite sides in the machine-body width direction, on the left in FIG. 8) and that is spaced from the first vertical wall portion 49a in the plate width direction W1, an extension wall 49c extending from an upper portion of the second vertical wall portion 49b toward an upper portion of the first vertical wall portion 49a, and a lower portion wall 49d that couples a lower portion of the first vertical wall portion 49a and a lower portion of the second vertical wall portion 49b. A space is provided between the extension wall 49c and the upper portion of the first vertical wall portion 49a.

As illustrated in FIG. 8, the opening 53 is defined by the first vertical wall portion 49a, the second vertical wall portion 49b, the extension wall 49c, and the lower portion wall 49d. In other words, the opening 53 includes a first edge (left edge) 53a that is one of opposite edges in the plate width direction W1, a second edge (right edge) 53b that is the other of opposite edges in the plate width direction W1, an upper edge 53c, and a lower edge 53d. The insertion groove 54 is defined between the extension wall 49c and the upper portion of the first vertical wall portion 49a. That is, the insertion groove 54 extends from an upper end of the vertical plate 49 toward the opening 53 to communicate with the opening 53. Also, the insertion groove 54 has a groove width W2 that allows the hydraulic hoses 45 held by the hose clamp 43 to pass therethrough in a direction perpendicular to a longitudinal direction of the hydraulic hoses 45.

Figure 9:
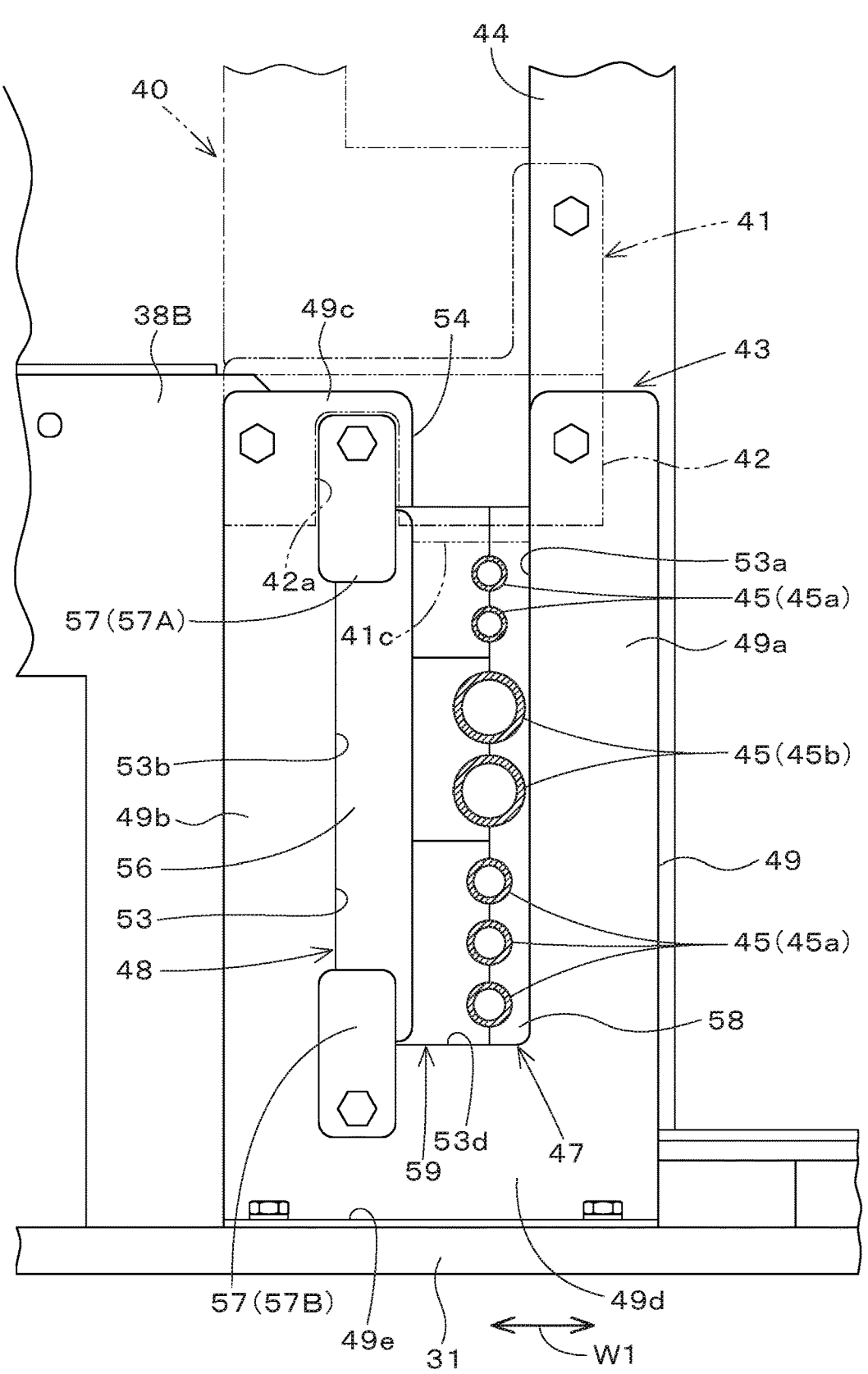
FIG. 9 is a front view illustrating a hose clamp structure.
Figure 10:
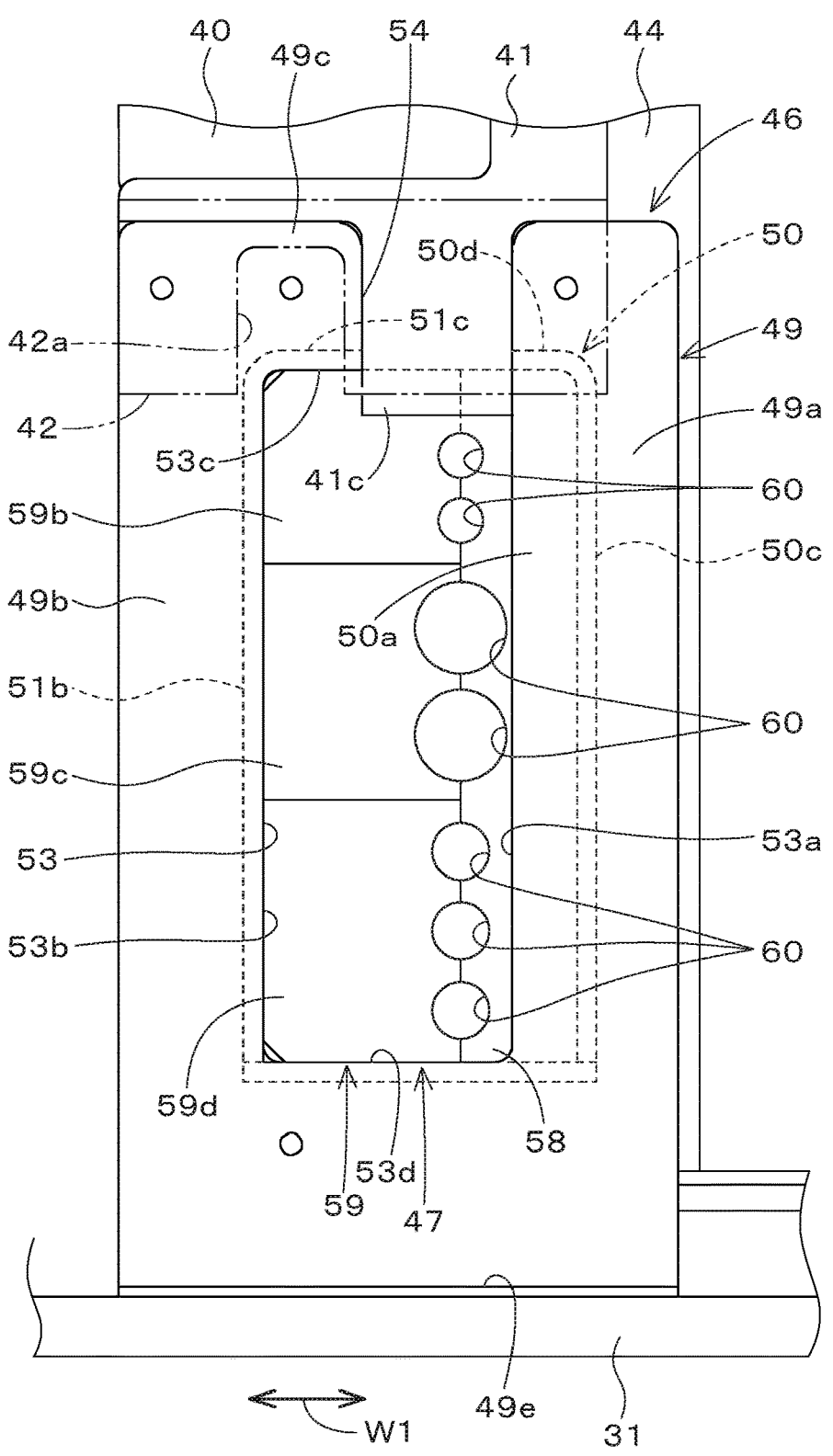
FIG. 10 is a front view illustrating a clamp structure.

As illustrated in FIGS. 7 and 9, the third cover 42 is superposed on an upper portion at an obverse side (front side) of the vertical plate 49, and the vertical plate 49 is bolted to the second partition plate 38B and the flange plate 44 together with the third cover 42. As illustrated in FIGS. 9 and 10, the cutout groove 42a of the third cover 42 is located at a position corresponding to the extension wall 49c of the vertical plate 49.

Figure 11:
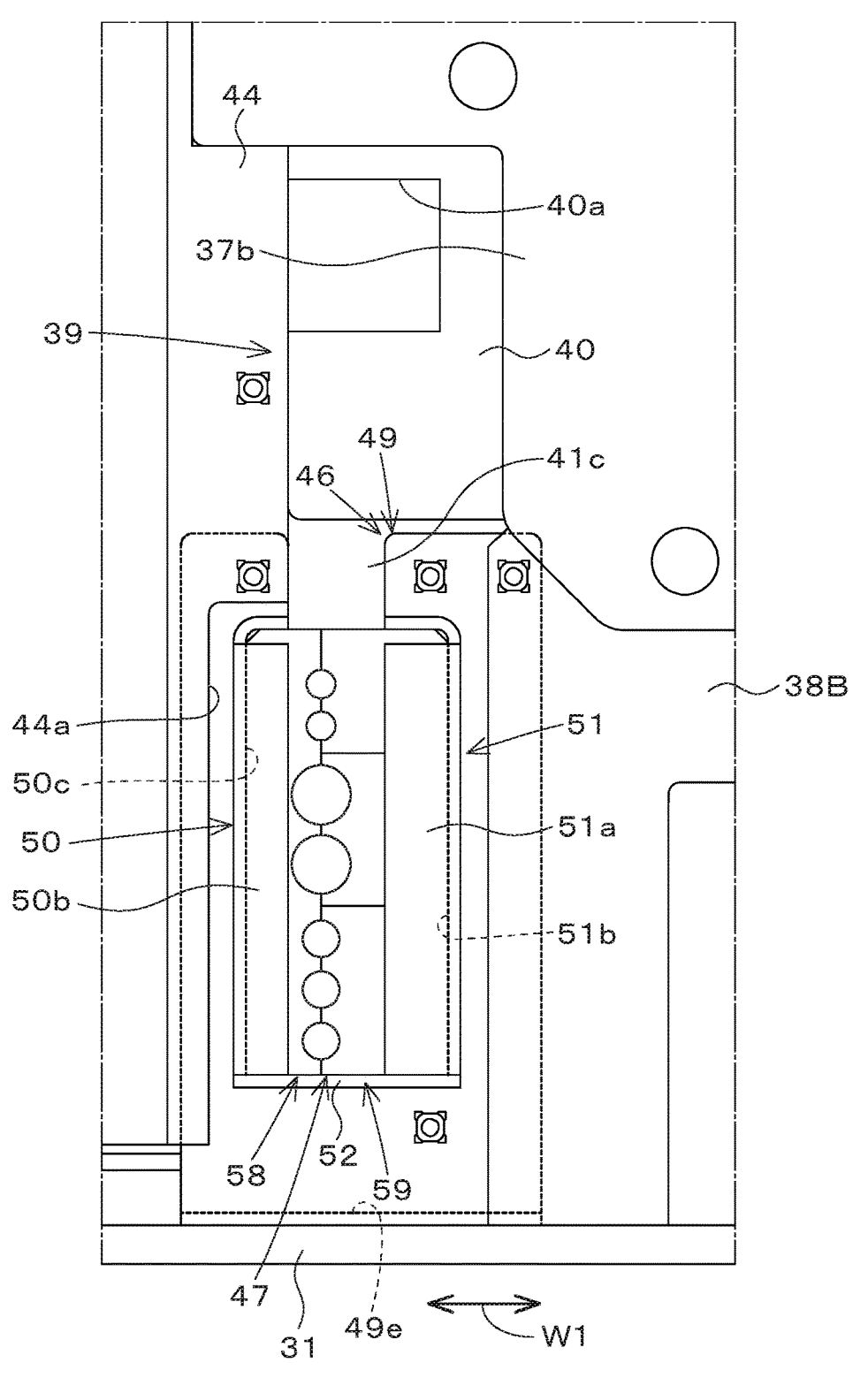
FIG. 11 is a back view illustrating a hose clamp structure.

As illustrated in FIGS. 10 and 11, the third portion 41c of the second cover 41 is inserted into the insertion groove 54. Also, the third portion 41c slightly protrudes from the insertion groove 54 toward the opening 53.

Also, as illustrated in FIG. 8, the vertical plate 49 is provided with a fixing wall 49e extending forward from a lower end of the lower portion wall 49d. As illustrated in FIG. 4, the fixing wall 49e is bolted onto the turning base plate 31.

When the vertical plate 49 and the cover member 39 are mounted, for example, first, the fixing wall 49e of the vertical plate 49 is bolted to the turning base plate 31, and then the cover member 39 is placed such that the third cover 42 is located on a front surface of the upper portion of the vertical plate 49. Then, the first cover 40 is bolted to the front wall 37b, the second cover 41 is bolted to the flange plate 44, and the third cover 42 and the vertical plate 49 are bolted together to the second partition plate 38B and the flange plate 44. Alternatively, any of the first cover 40, the second cover 41, and the third cover 42 may be fixed first. Still alternatively, the fixing wall 49e of the vertical plate 49 may be bolted to the turning base plate 31 after the third cover 42 and the vertical plate 49 are fastened together.

Note that the vertical plate 49 is not limited to the above-described configuration, and, for example, the extension wall 49c may be connected to the upper portion of the first vertical wall portion 49a. That is, the insertion groove 54 is not necessarily provided. Also, the first vertical wall portion 49a and the second vertical wall portion 49b are not limited to the configuration in which they extend in the up-down direction, and they may extend in the horizontal direction or an oblique direction. In other words, the vertical plate 49 may be placed such that the plate width direction W1 coincides with the up-down direction or an oblique direction inclined with respect to the up-down direction.

As illustrated in FIGS. 8, 10, 11, and 12, the groove portion 50 is provided at a back side of the vertical plate 49 (at the same side of the vertical plate 49 as the back surface 49f) at one of opposite portions in the plate width direction W1 of the vertical plate 49 such that the groove portion 50 is adjacent to the opening 53. Specifically, the groove portion 50 includes a first portion 50a, a second portion 50b, and a third portion 50c. The first portion 50a is a right portion of the first vertical wall portion 49a of the vertical plate 49. In other words, the first portion 50a is a portion of the vertical plate 49 that defines one of opposite edges (the first edge 53a) of the opening 53. The second portion 50b faces the first portion 50a with a space therebetween at the back side (at the same side of the vertical plate 49 as the back surface 49f) of the first portion 50a (vertical plate 49). The third portion 50c extends from one of opposite edges (left edge) of the second portion 50*b* in the plate width direction W1 toward the back surface 49*f* of the first portion 50*a* (vertical plate 49) and is fixed to the first portion 50*a* (vertical plate 49) by welding or the like. Thus, the groove portion 50 is open (opened) toward the opening 53 (right-ward) in the plate width direction W1. Also, the groove portion 50 extends in the up-down direction. A first extension wall 50*d* is provided at an upper end portion of the third portion 50*c* to extend rightward from the upper end portion.

The receiver portion 51 is provided at the back side of the vertical plate 49 (at the same side of the vertical plate 49 as the back surface 49*f*) at the other of the opposite portions in the plate width direction W1 of the vertical plate 49 (at the other of the opposite sides of the opening 53). Specifically, the receiver portion 51 includes a first wall portion 51*a* and a second wall portion 51*b*. The first wall portion 51*a* faces the opening 53 at the back side (at the same side of the vertical plate 49 as the back surface 49*f*) of the vertical plate 49. The second wall portion 51*b* extends from one of opposite edges (right edge) of the first wall portion 51*a* in the plate width direction W1 toward the back surface 49*f* of the vertical plate 49 and is fixed to the vertical plate 49 by welding or the like. A left surface of the second wall portion 51*b* is substantially flush with the second edge 53*b* of the opening 53. Also, the receiver portion 51 extends in the up-down direction. A second extension wall 51*c* is formed at an upper end portion of the second wall portion 51*b* to extend leftward (toward the first extension wall 50*d*) from the upper end portion. The first extension wall 50*d* and the second extension wall 51*c* are provided with a space ther-ebetween.

The coupling plate 52 is in a band plate shape that is long in the plate width direction W1 with plate surfaces facing in the up-down direction, and couples a lower end of the third portion 50*c* and a lower end of the second wall portion 51*b*.

The pressing member 48 includes a main plate 56 and at least one attachment plate 57. The main plate 56 is formed of a band plate member that is long in the up-down direction and whose plate surfaces face in the front-rear direction K1. The main plate 56 is inserted in the opening 53 to press a second clamping member 59 (described later). The attach-ment plate 57 is fixed to the main plate 56 by welding or the like, comes into contact with a front surface of the vertical plate 49, and is attached to the vertical plate 49 by a bolt 61. As illustrated in FIG. 8, the main plate 56 is formed to have a length in the up-down direction that allows the main plate 56 to be inserted into the opening 53 and that is substantially equal to a dimension in the up-down direction of the opening 53. The attachment plate 57 is provided on each of an upper portion and a lower portion of the main plate 56. That is, the attachment plate 57 includes a pair of attachment plates 57. An upper attachment plate 57A has a lower portion fixed to a front surface of the main plate 56 by welding or the like, and an upper portion protruding upward from the main plate 56. A lower attachment plate 57B has an upper portion fixed to the front surface of the main plate 56 by welding or the like, and a lower portion protruding downward from the main plate 56. Thus, when the attachment plates 57A and 57B are brought into contact with the front surface of the vertical plate 49 and attached to the vertical plate 49, the main plate 56 is brought into a state inserted into the opening 53.

As illustrated in FIG. 8, the clamping tool 47 includes a first clamping member 58 and a second clamping member 59. The first clamping member 58 and the second clamping member 59 are made of elastic members such as rubber. The clamping tool 47 has seven insertion holes 60 arranged in the up-down direction, through which the seven hydraulic hoses 45 are inserted in the front-rear direction K1. The clamping tool 47 is divided into a left first clamping member 58 and a right second clamping member 59 in a form of dividing each insertion hole 60 into two portions on the left and right. Thus, the hydraulic hoses 45 can be held by the first clamping member 58 and the second clamping member 59 sandwiching the hydraulic hoses 45 so that the hydraulic hoses 45 are inserted through the insertion holes 60. Also, a width W3 in the plate width direction W1 of the first clamping member 58 is narrower than a width W4 in the plate width direction W1 of the second clamping member 59. Also, a thickness 59*a* of the second clamping member 59 (a dimension in a direction perpendicular to the plate width direction W1 and the up-down direction) is thicker than a thickness 58*a* of the first clamping members 58.

Figure 12:
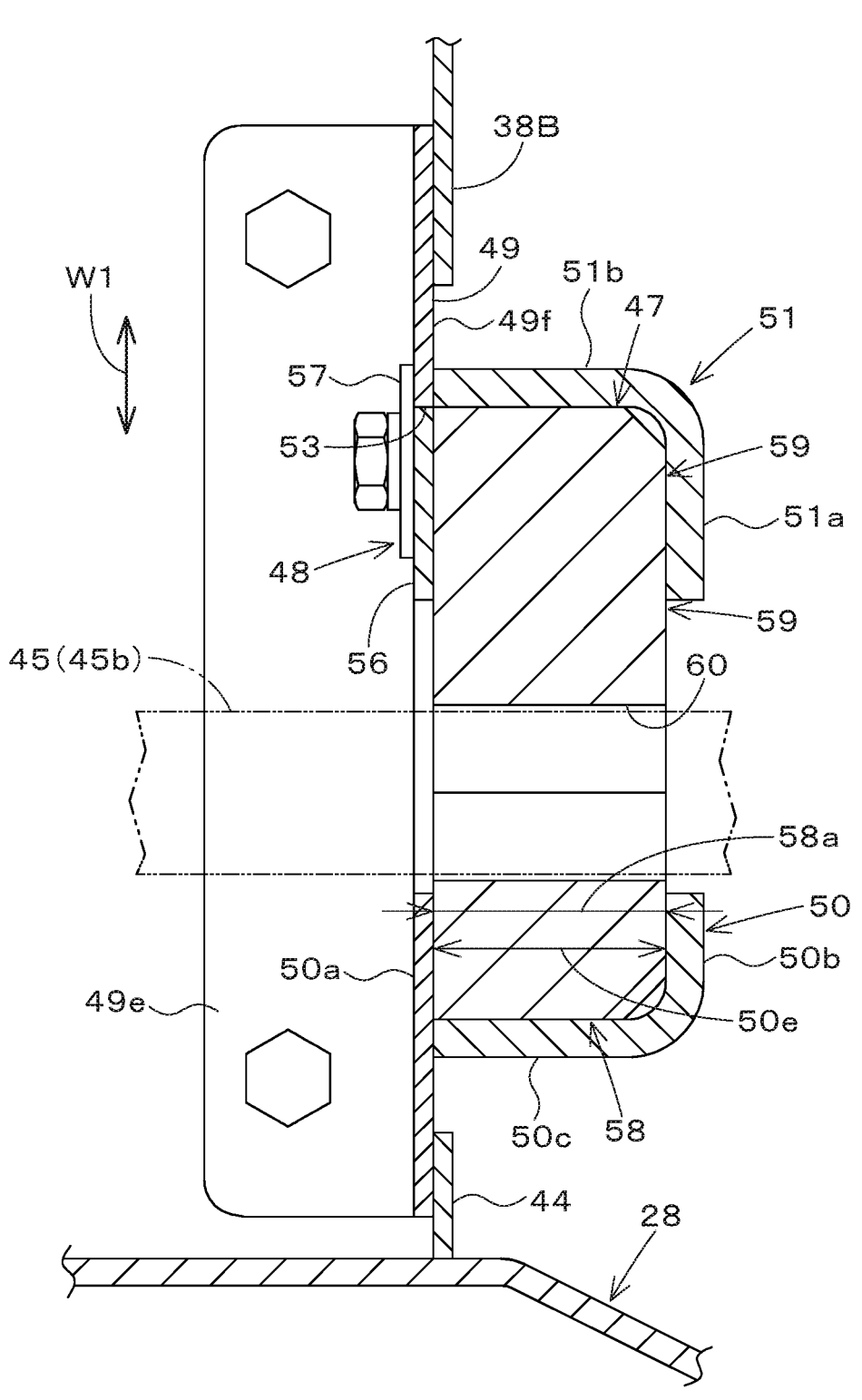
FIG. 12 is a plan sectional view illustrating a hose clamp structure.
Figure 13:
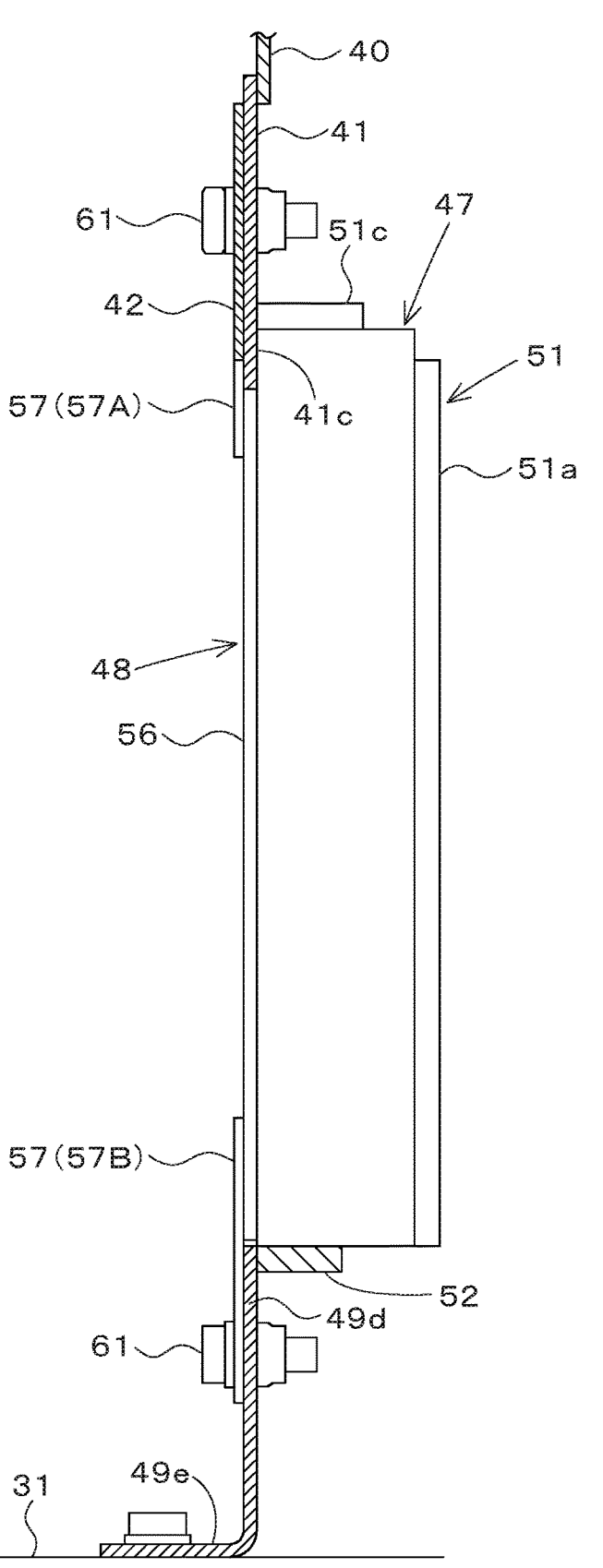
FIG. 13 is a side sectional view illustrating a hose clamp structure.

As illustrated in FIG. 10, the first clamping member 58 is a member to be inserted in the groove portion 50. A length in the up-down direction of the first clamping member 58 is formed as a length extending from the first extension wall 50*d* to the coupling plate 52. As illustrated in FIG. 12, the thickness 58*a* of the first clamping member 58 is a thickness that allows the first clamping member 58 to be inserted into the groove portion 50 and is substantially equal to a groove width 50*e* of the groove portion 50.

As illustrated in FIG. 10, the first clamping member 58 has a left portion inserted into the groove portion 50, and a right portion protruding from the groove portion 50. Halves of the insertion holes 60 are formed in the portion of the first clamping member 58 protruding from the groove portion 50.

Figure 14:
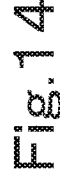
FIG. 14 is a plan sectional view illustrating an example of a method of mounting a hose.

The second clamping member 59 is placed through the opening 53 from the front side (forward side) of the vertical plate 49 with the first clamping member 58 being inserted in the groove portion 50 to contact a front surface of the first wall portion 51*a* and the left surface of the second wall portion 51*b* of the receiver portion 51 (contact the receiver portion 51). As illustrated in FIG. 14, the thickness 59*a* of the second clamping member 59 is a dimension larger than a distance H1 from the front surface of the first wall portion 51*a* to the back surface 49*f* of the vertical plate 49. That is, the second clamping member 59 has a thickness such that the second clamping member 59 protrudes forward through the back surface 49*f* of the vertical plate 49 via the opening 53 when the second clamping member 59 is not pressed by the pressing member 48. Halves of the insertion holes 60 are in the left portion of the second clamping member 59. The right portion of the second clamping member 59 is a portion with which the main plate 56 of the pressing member 48 comes into contact.

As illustrated in FIG. 8, the second clamping member 59 is divided into three portions in the up-down direction. An upper portion 59*b* is a portion corresponding to two of the insertion holes 60 on an upper portion side among the seven insertion holes 60, a middle portion 59*c* is a portion corre-sponding to two of the insertion holes 60 in a middle portion among the seven insertion holes 60, and a lower portion 59*d* is a portion corresponding to three of the insertion holes 60 on a lower portion side among the seven insertion holes 60.

Various methods are conceivable for mounting the hydraulic hoses 45 to the hose clamp 43.

For example, the hydraulic hoses 45 can be held by mounting the clamping tool 47 and the pressing member 48 to the holding body 46 in a state in which the cover member 39 and the holding body 46 are attached.

In this case, as illustrated in the drawing on the left of FIG. 14, first, the first clamping member 58 is inserted into the groove portion 50. Then, the hydraulic hoses 45 passed through the opening 53 are fitted to portions of the first clamping member 58 where the insertion holes 60 are provided (portions corresponding to halves of the insertion holes 60). Then, as illustrated in the drawing on the right of FIG. 14, the second clamping member 59 is placed through the opening 53 from the front side of the vertical plate 49 to contact the receiver portion 51 (the first wall portion 51*a* and the second wall portion 51*b*), and the hydraulic hoses 45 are held by the first clamping member 58 and the second clamping member 59. At this time (in a state before the second clamping member 59 is pressed by the pressing member 48), the second clamping member 59 protrudes on the front surface side with respect to the back surface 49*f* of the vertical plate 49 via the opening 53. Then, the pressing member 48 is bolted to the vertical plate 49. In so doing, as illustrated in FIG. 12, the main plate 56 of the pressing member 48 is inserted in the opening 53, and presses the second clamping member 59 from the front side (the side opposite the receiver portion 51) to elastically deform the second clamping member 59. Since the second clamping member 59 is elastically deformed, the hydraulic hoses 45 and the first clamping member 58 are pressed by the second clamping member 59, and the hydraulic hoses 45 are firmly held by the hose clamp 43.

With this, since the hydraulic hoses 45 are sandwiched and fixed by the first clamping member 58 and the second clamping member 59 by the second clamping member 59 being elastically deformed, it is possible to suppress pulsation of the hydraulic hoses 45 and to improve vibration damping property. Also, since the second clamping member 59 is elastically deformed, it is possible to secure sealing property and to prevent or reduce the entry of hot air from the prime mover chamber E2 into the machine body 2. Also, since the first clamping member 58 and the second clamping member 59 can be easily removed only by removing the pressing member 48, the hydraulic hoses 45 can be easily removed.

Alternatively, as a method of mounting the hydraulic hoses 45 to the hose clamp 43, it is conceivable to hold the hydraulic hoses 45 by the hose clamp 43 before the prime mover E1 is mounted to the machine body 2.

In this case, the hose clamp 43 is mounted on the machine body 2 side after the prime mover E1 is mounted to the machine body 2. Specifically, first, before the prime mover E1 is mounted to the machine body 2, the hydraulic hoses 45 are inserted through the opening 53, the hydraulic hoses 45 are sandwiched by the first clamping member 58 and the second clamping member 59, and then the pressing member 48 is attached to hold the hydraulic hoses 45 by the hose clamp 43. Then, the prime mover E1 is lowered onto the turning base plate 31 and installed on the turning base plate 31 while the hose clamp 43 in a state of holding the hydraulic hoses 45 is placed on the prime mover E1. Thereafter, for example, the hose clamp 43 is located forward of the installation position, and the partition wall main body 37 and the hydraulic fluid tank 28 are mounted. Then, for example, the fixing wall 49*e* of the hose clamp 43 to which the hydraulic hoses 45 have been mounted is bolted to the turning base plate 31. Thereafter, the cover member 39 is placed such that the third cover 42 is located on the front surface of the upper portion of the vertical plate 49, the first cover 40 is bolted to the front wall 37*b*, and the second cover 41 is bolted to the flange plate 44. Thereafter, the third cover 42 and the vertical plate 49 are bolted together to the second partition plate 38B and the flange plate 44. Alternatively, the third cover 42 and the vertical plate 49 may be fastened together first, and then the first cover 40 and the second cover 41 may be fixed. Still alternatively, the third cover 42 and the vertical plate 49 may be fastened together, and then the fixing wall 49*e* of the vertical plate 49 may be bolted to the turning base plate 31.

In this mounting method, the holding of the hydraulic hoses 45 by the hose clamp 43 can be performed in a wide place, and hence workability is good. Also, the hydraulic hoses 45 can be inserted into the opening 53 via the insertion groove 54, and hence the insertion of the hydraulic hoses 45 can be easily performed.

Alternatively or additionally, as a method of mounting the hydraulic hoses 45 to the hose clamp 43, it is conceivable to hold the hydraulic hoses 45 by the hose clamp 43 in a state in which the cover member 39 is not attached.

In this case, for example, in a state in which the fixing wall 49*e* of the holding body 46 is fixed to the turning base plate 31, the hydraulic hoses 45 are inserted through the opening 53 via the insertion groove 54, the hydraulic hoses 45 are sandwiched by the first clamping member 58 and the second clamping member 59, and then the pressing member 48 is attached. Then, the cover member 39 is mounted to fix an upper portion of the holding body 46. Alternatively or additionally, after the hydraulic hoses 45 are mounted to the holding body 46, the fixing wall 49*e* may be fixed to the turning base plate 31. Additionally or alternatively, after the hydraulic hoses 45 are mounted to the holding body 46, the third cover 42 and the vertical plate 49 may be bolted together to the second partition plate 38B and the flange plate 44, and then the fixing wall 49*e* may be fixed to the turning base plate 31. Even in this mounting method, the hydraulic hoses 45 can be inserted through the opening 53 via the insertion groove 54, and hence the insertion of the hydraulic hoses 45 can be easily performed.

A hose clamp structure as has been described includes a vertical plate 49 having an opening 53, a groove portion 50 provided at a back side (on the same side of the vertical plate 49 as its back surface 49*f*) of the vertical plate 49 on one of opposite sides of the opening 53 in a plate-surface parallel direction (plate width direction W1) such that the groove portion 50 is adjacent to the opening 53, the groove portion 50 being open toward the opening 53 in the plate-surface parallel direction (plate width direction W1), a receiver portion 51 provided at the back side (on the same side of the vertical plate 49 as its back surface 49*f*) of the vertical plate 49 on the other of the opposite sides of the opening 53 in the plate-surface parallel direction (plate width direction W1), a first clamping member 58 to be inserted in the groove portion 50, a second clamping member 59 made of an elastic member and configured such that the second clamping member 59 is placed in the receiver portion 51 through the opening 53 from a front side of the vertical plate 49 to contact the receiver portion 51 with the first clamping member 58 being inserted in the groove portion 50 and such that at least one hose (hydraulic hose 45) passing through the opening 53 is held between the first clamping member 58 and the second clamping member 59, and a pressing member 48 to be attached to the vertical plate 49 to press the second clamping member 59 from the front side of the vertical plate 49 to elastically deform the second clamping member 59 to cause the second clamping member 59 to press the first clamping member 58.

With this configuration, hose(s) (hydraulic hose(s) 45) can be easily removed by simply removing the pressing member 48 from the vertical plate 49. Also, since the hydraulic hose 45 is fixed by being clamped between the first clamping member 58 and the second clamping member 59 by elastically deforming the second clamping member 59, it is possible to prevent or reduce the pulsation of the hose 45 which is a hydraulic hose and to improve vibration damping properties.

The first clamping member 58 may have a thickness substantially equal to a groove width 50e of the groove portion 50. The second clamping member 59 may have a thickness such that the second clamping member 59 protrudes forward through a back surface 49f of the vertical plate 49 via the opening 53 when the second clamping member 59 is in contact with the receiver portion 51 but is not pressed by the pressing member 48. The pressing member 48 may include a main plate 56 to be inserted in the opening 53 to press the second clamping member 59, and an attachment plate 57 fixed to the main plate 56 to contact a front surface of the vertical plate 49 and attached to the vertical plate 49.

With this configuration, the first clamping member 58 can be easily mounted.

The vertical plate 49 may have an insertion groove 54 extending from an outer edge of the vertical plate 49 toward the opening 53 to communicate with the opening 53 and configured to allow the at least one hose 45 to pass through the insertion groove 54 in a direction perpendicular to a longitudinal direction of the at least one hose 45.

With this configuration, the hose 45 can be easily passed through the opening 53 via the insertion groove 54.

The groove portion 50 may include a first portion 50a which is a portion of the vertical plate 49 that defines one of opposite edges (first edge 53a) of the opening 53 in the plate-surface parallel direction (plate width direction W1), a second portion 50b facing the first portion 50a at the back side (on the same side of the vertical plate 49 as its back surface 49f) of the vertical plate 49, and a third portion 50c extending from one of opposite edges of the second portion 50b in the plate-surface parallel direction (plate width direction W1) toward a back surface 49f of the vertical plate 49 and fixed to the vertical plate 49.

With this configuration, a portion of the vertical plate 49 functions as a portion of the groove portion 50, and thus it is possible to simplify the structure.

The receiver portion 51 may include a first wall portion 51a facing the opening 53 at the back side (on the same side of the vertical plate 49 as its back surface 49f) of the vertical plate 49, and a second wall portion 51b extending from one of opposite edges of the first wall portion 51a in the plate-surface parallel direction (plate width direction W1) toward a back surface 49f of the vertical plate 49 and fixed to the vertical plate 49. The second clamping member 59 may be placed to contact the first wall portion 51a and the second wall portion 51b through the opening 53 from the front side of the vertical plate 49.

With this configuration, the second clamping member 59 can be properly elastically deformed by being clamped between the pressing member 48 and the first wall portion 51a.

A working machine 1 includes a machine body 2, a prime mover E1 on the machine body 2, a partition wall 36 to separate a prime mover chamber E2 housing the prime mover E1 from an outside of the prime mover chamber E2, and one of the above-described hose clamp structures, wherein the vertical plate 49 defines a portion of the partition wall 36, and the at least one hose 45 is guided from the prime mover chamber E2 to an outside of the partition wall 36.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hose clamp structure comprising:
   a vertical plate having an opening;
   a groove portion provided at a back side of the vertical plate on one of opposite sides of the opening in a plate-surface parallel direction such that the groove portion is adjacent to the opening, the groove portion being open toward the opening in the plate-surface parallel direction;
   a receiver portion provided at the back side of the vertical plate on the other of the opposite sides of the opening in the plate-surface parallel direction;
   a first clamping member to be inserted in the groove portion;
   a second clamping member made of an elastic member and configured such that the second clamping member is placed in the receiver portion through the opening from a front side of the vertical plate to contact the receiver portion with the first clamping member being inserted in the groove portion and such that at least one hose passing through the opening is held between the first clamping member and the second clamping member; and
   a pressing member to be attached to the vertical plate;
   wherein the pressing member includes a main plate to be inserted in the opening to contact the second clamping member, and an attachment plate fixed to the main plate and attached to the vertical plate, the pressing member being configured such that the attachment plate is attached to the vertical plate by a bolt inserted through the attachment plate and the vertical plate in a direction perpendicular to a front surface of the vertical plate from the front side of the vertical plate with the attachment plate overlapping the front surface of the vertical plate to cause the main plate to press the second clamping member from the front side of the vertical plate to elastically deform the second clamping member, to cause the second clamping member to press the first clamping member.

2. The hose clamp structure according to claim 1, wherein the groove portion includes a first portion which is a portion of the vertical plate that defines one of opposite edges of the opening in the plate-surface parallel direction, a second portion facing the first portion at the back side of the vertical plate, and a third portion extending from one of opposite edges of the second portion in the plate-surface parallel direction toward a back surface of the vertical plate and fixed to the vertical plate.

3. The hose clamp structure according to claim 1, wherein the receiver portion includes a first wall portion facing the opening at the back side of the vertical plate, and a second wall portion extending from one of opposite edges of the first wall portion in the plate-surface parallel direction toward a back surface of the vertical plate and fixed to the vertical plate; and
   the second clamping member is placed to contact the first wall portion and the second wall portion through the opening from the front side of the vertical plate.

4. A working machine comprising:
   a machine body;
   a prime mover on the machine body;
   a partition wall to separate a prime mover chamber housing the prime mover from an outside of the prime mover chamber; and
   the hose clamp structure according to claim 1; wherein the vertical plate defines a portion of the partition wall; and the at least one hose is guided from the prime mover chamber to an outside of the partition wall.

5. A hose clamp structure, comprising:

a vertical plate having an opening;

a groove portion provided at a back side of the vertical plate on one of opposite sides of the opening in a plate-surface parallel direction such that the groove portion is adjacent to the opening, the groove portion being open toward the opening in the plate-surface parallel direction;

a receiver portion provided at the back side of the vertical plate on the other of the opposite sides of the opening in the plate-surface parallel direction;

a first clamping member to be inserted in the groove portion;

a second clamping member made of an elastic member and configured such that the second clamping member is placed in the receiver portion through the opening from a front side of the vertical plate to contact the receiver portion with the first clamping member being inserted in the groove portion and such that at least one hose passing through the opening is held between the first clamping member and the second clamping member; and a pressing member to be attached to the vertical plate to press the second clamping member from the front side of the vertical plate to elastically deform the second clamping member to cause the second clamping member to press the first clamping member;

wherein the first clamping member has a thickness substantially equal to a groove width of the groove portion;

the second clamping member has a thickness such that the second clamping member protrudes forward through a back surface of the vertical plate via the opening when the second clamping member is in contact with the receiver portion but is not pressed by the pressing member; and the pressing member includes a main plate to be inserted in the opening to press the second clamping member, and an attachment plate fixed to the main plate to contact a front surface of the vertical plate and attached to the vertical plate.

6. A hose clamp structure, comprising:

a vertical plate having an opening;

a groove portion provided at a back side of the vertical plate on one of opposite sides of the opening in a plate-surface parallel direction such that the groove portion is adjacent to the opening, the groove portion being open toward the opening in the plate-surface parallel direction;

a receiver portion provided at the back side of the vertical plate on the other of the opposite sides of the opening in the plate-surface parallel direction;

a first clamping member to be inserted in the groove portion;

a second clamping member made of an elastic member and configured such that the second clamping member is placed in the receiver portion through the opening from a front side of the vertical plate to contact the receiver portion with the first clamping member being inserted in the groove portion and such that at least one hose passing through the opening is held between the first clamping member and the second clamping member; and a pressing member to be attached to the vertical plate to press the second clamping member from the front side of the vertical plate to elastically deform the second clamping member to cause the second clamping member to press the first clamping member;

wherein the vertical plate has an insertion groove extending from an outer edge of the vertical plate toward the opening to communicate with the opening and configured to allow the at least one hose to pass through the insertion groove in a direction perpendicular to a longitudinal direction of the at least one hose.

* * * * *